United States Patent
Arnould

(10) Patent No.: US 11,106,618 B2
(45) Date of Patent: Aug. 31, 2021

(54) METHOD FOR ADDRESSING AN INTEGRATED CIRCUIT ON A BUS AND CORRESPONDING DEVICE

(71) Applicant: STMicroelectronics (Alps) SAS, Grenoble (FR)

(72) Inventor: Patrick Arnould, Voreppe (FR)

(73) Assignee: STMicroelectronics (ALPS) SAS, Grenoble (FR)

( * ) Notice: Subject to any disclaimer, the term of this patent is extended or adjusted under 35 U.S.C. 154(b) by 0 days.

(21) Appl. No.: 16/908,253

(22) Filed: Jun. 22, 2020

(65) Prior Publication Data
US 2020/0409902 A1    Dec. 31, 2020

(30) Foreign Application Priority Data

Jun. 26, 2019   (FR) ........................................ 1906951

(51) Int. Cl.
| | | |
|---|---|---|
| *G06F 13/42* | (2006.01) | |
| *G06F 13/16* | (2006.01) | |
| *G06F 9/54* | (2006.01) | |
| *G06F 9/32* | (2018.01) | |
| *G06F 9/24* | (2006.01) | |
| *G06F 1/24* | (2006.01) | |

(52) U.S. Cl.
CPC ............ *G06F 13/4282* (2013.01); *G06F 1/24* (2013.01); *G06F 9/24* (2013.01); *G06F 9/321* (2013.01); *G06F 9/546* (2013.01); *G06F 13/1605* (2013.01); *G06F 2213/0016* (2013.01)

(58) Field of Classification Search
None
See application file for complete search history.

(56) References Cited

U.S. PATENT DOCUMENTS 6,009,479 A  * 12/1999  Jeffries ................. G06F 11/006
                                                    710/62
6,438,624 B1 *  8/2002  Ku ...................... G06F 13/4282
                                                    710/100
(Continued)

FOREIGN PATENT DOCUMENTS

CN        1461440 A  * 12/2003  ......... G06F 13/4291
CN    112131165 A  * 12/2020
(Continued)

OTHER PUBLICATIONS

'I2C Dynamic Addressing' Application Report SCAA137, by Texas Instruments, Jul. 2019. (Year: 2019).*
(Continued)

*Primary Examiner* — Steven G Snyder
(74) *Attorney, Agent, or Firm* — Slater Matsil, LLP

(57) ABSTRACT

A method can be used for addressing a slave integrated circuit connected to a bus. The slave integrated circuit has a default address on the bus. The method includes receiving, at the slave integrated circuit, an addressing message conveyed on the bus. The addressing message contains a replacement address. The method also includes replacing the default address within the slave integrated circuit with the replacement address upon receiving the addressing message, restarting the slave integrated circuit, and upon the restarting, assigning the replacement address as a new default address.

16 Claims, 4 Drawing Sheets

(56) References Cited

U.S. PATENT DOCUMENTS

| | | | |
|---|---|---|---|
| 6,745,270 B1 * | 6/2004 | Barenys | H04L 61/2038 |
| | | | 710/104 |
| 7,694,050 B1 | 4/2010 | Chan et al. | |
| 8,225,021 B2 * | 7/2012 | Adkins | G06F 13/4291 |
| | | | 710/110 |
| 8,386,657 B2 * | 2/2013 | Adkins | G06F 13/4291 |
| | | | 710/9 |
| 10,063,839 B2 * | 8/2018 | Muukki | H04N 13/239 |
| 10,204,066 B2 * | 2/2019 | Miluzzi | G06F 13/4282 |
| 10,459,862 B2 * | 10/2019 | Miluzzi | G06F 13/364 |
| 10,817,451 B1 * | 10/2020 | Tabuchi | G06F 13/404 |
| 10,860,509 B1 * | 12/2020 | Watkins | G06F 13/4282 |
| 2010/0306431 A1 * | 12/2010 | Adkins | G06F 13/4291 |
| | | | 710/110 |
| 2011/0119419 A1 * | 5/2011 | Chapelle | G06F 13/4291 |
| | | | 710/110 |
| 2012/0284429 A1 * | 11/2012 | Adkins | G06F 13/4291 |
| | | | 710/3 |
| 2013/0318267 A1 * | 11/2013 | Chapelle | G06F 13/4291 |
| | | | 710/110 |
| 2016/0323558 A1 * | 11/2016 | Muukki | G06F 13/4282 |
| 2018/0143935 A1 * | 5/2018 | Cox | G06F 13/4221 |
| 2018/0150424 A1 * | 5/2018 | Miluzzi | G06F 13/404 |
| 2019/0114274 A1 * | 4/2019 | Miluzzi | G06F 13/364 |

FOREIGN PATENT DOCUMENTS

| | | | | |
|---|---|---|---|---|
| JP | 2004510228 A | * | 4/2004 | |
| KR | 20150061348 A | * | 6/2015 | |
| RU | 2571583 C2 | * | 12/2015 | G06F 13/4068 |
| WO | WO-0225449 A2 | * | 3/2002 | G06F 13/4291 |
| WO | WO-2010138745 A1 | * | 12/2010 | G06F 13/4291 |
| WO | WO-2012054066 A1 | * | 4/2012 | G06F 13/4068 |
| WO | WO-2019204292 A1 | * | 10/2019 | G06F 21/73 |

OTHER PUBLICATIONS

'Troubleshooting I2C Bus Protocol' Application Report SCAA106, by Texas Instruments, Oct. 2009. (Year: 2009).*
'The I2C-BUS Specification' Version 2.0, Dec. 1998. (Year: 1998).*
'PSoC Creator Component Datasheet—I2C Master/Multi-Master/Slave 3.0' Cypress, 2011. (Year: 2011).*

* cited by examiner

METHOD FOR ADDRESSING AN INTEGRATED CIRCUIT ON A BUS AND CORRESPONDING DEVICE

CROSS-REFERENCE TO RELATED APPLICATIONS

This application claims priority to French Patent Application No. 1906951, filed on Jun. 26, 2019, which application is hereby incorporated herein by reference.

TECHNICAL FIELD

Embodiments relate to a method and device for addressing an integrated circuit on a bus.

BACKGROUND

The $I^2C$ ("inter-integrated circuit") bus is a well-known inter-integrated circuit serial communication standard.

FIG. 1 shows the signals of one example of communication carried out on an $I^2C$ bus.

The $I^2C$ bus has two wires, a serial data line SDA and a serial clock line SCL, which transmit information between the integrated circuits connected to the $I^2C$ bus. Each slave integrated circuit is recognized by a unique slave address (whether it is, for example, a microcontroller, a memory or a keyboard interface) and is able to operate as a transmitter and/or a receiver, depending on the function of the integrated circuit.

The unique slave address is generally assigned to the slave integrated circuit during manufacture thereof.

In addition to transmitters and receivers, the integrated circuits may also be considered to be masters or slaves during the transmission of data. A master integrated circuit is the device that triggers a transfer of data on the bus and generates the clock signals to allow this transfer. At this time, any addressed integrated circuit is considered to be a slave.

The line SDA is a bidirectional line, and the data to be communicated via the $I^2C$ bus are formed by signals that may have a HIGH level or a LOW level.

During a data transmission, the signal of the line SDA must be stable during the HIGH period of the clock signal. The HIGH or LOW state of the data line SDA is able to change only when the clock signal on the line SCL is LOW.

All of the transactions begin with a starting condition "START" STT and finish with an end condition "STOP" STP. A HIGH to LOW transition on the line SDA whilst SCL is HIGH defines a starting condition STT. A LOW to HIGH transition on the line SDA whilst SCL is HIGH defines an end condition STP.

On the line SDA, the HIGH and LOW levels of the signal represent the logic values "1" and "0" respectively.

The data transfers follow the format shown by FIG. 1. After the starting condition STT, a slave address SLADR is dispatched. This address is coded on 7 bits followed by an eighth direction bit R/$\overline{W}$; a "zero" indicates a data transmission (or write operation) W, and a "one" indicates a data reception request (or read operation) R.

The data DATA1, DATA2 are transmitted byte-wise (i.e. 8 bits) on the line SDA. The number of bytes that is able to be transmitted per transfer is unlimited. Each byte must be followed by a confirmation bit ACK. By convention, the data DATA1, DATA2 are transferred with the most significant bit MSB in first position.

Confirmation takes place after each byte. The confirmation bit ACK allows the receiver to signal to the transmitter that the byte has been successfully received and that another byte may be dispatched.

A data transfer always finishes with an end condition STP generated by the master.

However, the unique slave address may be common to a plurality of integrated circuits, for example when the slave integrated circuits are provided by different manufacturers, creating an address conflict, the master integrated circuit receiving a plurality of messages in response to a message containing a slave address.

In other uses of the bus, the unique slave address assigned by the manufacturer of the slave integrated circuit is not suitable for the implementation of the bus. It is then necessary to modify this address such that instructions implemented by the master integrated circuit identifying a specific integrated circuit, for example a keyboard, bears a predefined slave address.

At present, integrated circuits incorporate input/output ports, known to those skilled in the art under the acronym GPIO "general-purpose input/output", for configuring the unique slave address.

However, ports are used exclusively or temporarily to address the slave integrated circuit to the detriment of other functionalities or limiting the use of the ports. If additional ports are required for other functionalities, it is necessary to add ports, accordingly increasing the silicon surface of the slave integrated circuit and its consumption.

Another known solution consists, when manufacturing the circuit, in assigning a predetermined address provided by the user of the circuit.

However, this complicates the manufacture of the circuit.

SUMMARY

Modes of implementation and embodiments of the invention relate to integrated circuits connected to a bus, for example, at least one slave integrated circuit and one master integrated circuit that are connected by an $I^2C$ bus. Particular embodiments relate to the addressing of these slave circuits on the bus.

Embodiments can simplify the addressing of a slave integrated circuit without using ports and while offering increased flexibility in the addressing of the circuit.

According to some modes of implementation and embodiments, it is advantageously proposed to draw on a communication standard to change the unique slave address without using physical resources (hardware) of the slave integrated circuit.

According to one aspect, a method can be used for addressing at least one slave integrated circuit connected to a bus. The at least one slave circuit has a default address on the bus. The method includes, within the at least one slave integrated circuit, replacing the default address with a replacement address upon receiving an addressing message conveyed on the bus and containing the replacement address.

The default address is advantageously changed by receiving the addressing message able to be interpreted by way of a communication interface of the slave integrated circuit without implementing additional physical resources (hardware) of the slave integrated circuit.

According to one mode of implementation, the bus is an $I^2C$ bus, and the addressing message is transmitted by a master integrated circuit connected to the bus.

According to another mode of implementation, the at least one slave integrated circuit also has a second unique address, and the addressing message contains the second address, such that the slave integrated circuit identifies itself as being the intended recipient of the addressing message.

Only the slave integrated circuit denoted by the second unique address contained in the addressing message is configured so as to replace its default address with the replacement address.

The second unique address is an extended address of the slave integrated circuit.

In contrast to the default address, this address is not recognized by the bus.

According to yet another mode of implementation, a plurality of slave integrated circuits are connected to the bus, and the addressing message furthermore contains an indication able to be interpreted by the slave circuits, only the slave integrated circuit denoted by the second address contained in the addressing message replacing its default address with the replacement address.

According to yet another mode of implementation, replacing the default address with the replacement address comprises storing the replacement address in a non-volatile memory of the slave integrated circuit and, upon each subsequent restart of the slave circuit. The slave integrated circuit reads the content of the memory defining its default address on the bus.

Upon each subsequent restart with the replacement of the default address with the replacement address, the slave integrated circuit is identified on the bus by the replacement address.

According to another mode of implementation, replacing the default address with the replacement address comprises storing the replacement address in a volatile memory of the slave integrated circuit and, upon each subsequent restart of the slave integrated circuit. The master integrated circuit retransmits the addressing message.

According to another aspect, what is proposed is a device, comprising at least one slave integrated circuit connected to a bus, the at least one slave circuit having a default address on the bus, the device being configured so as to replace the default address within the at least one slave integrated circuit with a replacement address upon receiving an addressing message conveyed on the bus and containing the replacement address.

According to one embodiment, the device furthermore comprises a master integrated circuit connected to the bus, the bus being an I²C bus, the master circuit being configured so as to transmit the addressing message.

According to another embodiment, the slave integrated circuit also has a second unique address, and the addressing message contains the second address, such that the slave integrated circuit is configured so as to identify itself as being the intended recipient of the addressing message.

According to yet another embodiment, the device has a plurality of slave integrated circuits connected to the bus, and the addressing message furthermore contains an indication able to be interpreted by the slave integrated circuits, only the slave integrated circuit denoted by the second address contained in the addressing message being configured so as to replace its default address with the replacement address.

According to yet another embodiment, the slave integrated circuit comprises a non-volatile memory configured so as to store the replacement address such that, upon each subsequent restart of the slave integrated circuit, the slave integrated circuit is configured so as to read the content of the memory defining its default address on the bus.

According to yet another embodiment, the slave integrated circuit comprises a volatile memory configured so as to store the replacement address, the master integrated circuit being configured so as to retransmit the addressing message upon each subsequent restart of the slave integrated circuit.

BRIEF DESCRIPTION OF THE DRAWINGS

Other advantages and features of the invention will become apparent upon examining the detailed description of completely non-limiting embodiments and the appended drawings, in which.

DETAILED DESCRIPTION OF ILLUSTRATIVE EMBODIMENTS

Figure 1:
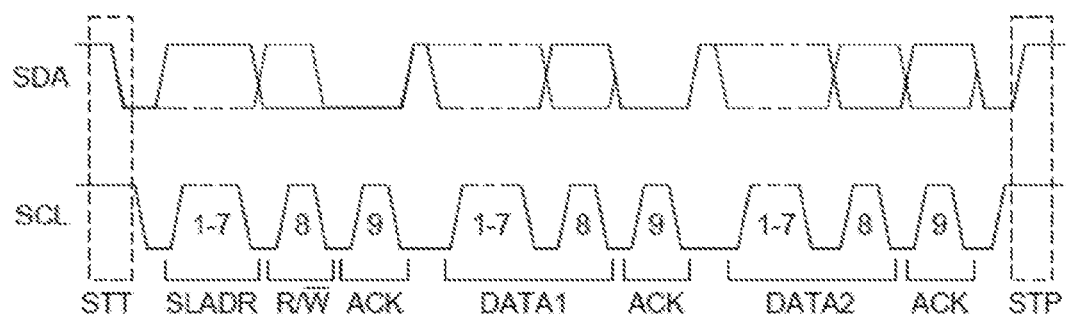
FIG. 1 shows the signals of one example of communication carried out on an I²C bus.
Figure 2:
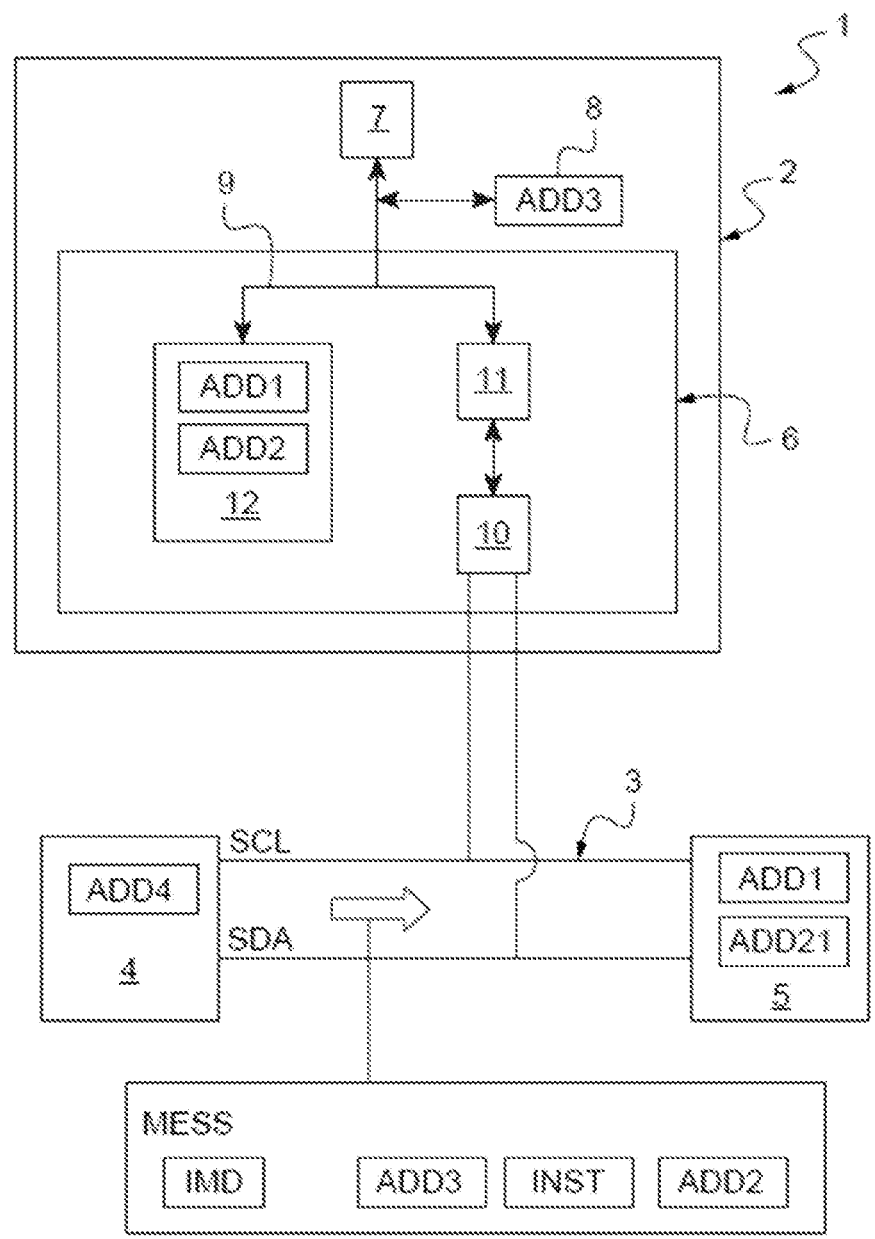
FIG. 2 shows one example of a first embodiment of a device having a slave integrated circuit connected to a bus.

Reference is made to FIG. 2, which shows one example of a first embodiment of a device 1 having a slave integrated circuit 2 connected to a bus 3.

The device 1 furthermore comprises a master integrated circuit 4 connected to the bus 3. The master integrated circuit 4 is identified on the bus 3 by an address ADD4. The bus 3 is for example an I²C bus.

The device 1 may comprise a second slave integrated circuit 5 configured so as to communicate with the bus 3.

The second slave integrated circuit 5 may have an architecture identical to the slave integrated circuit 2 or a different architecture.

It is assumed hereinafter that the second slave integrated circuit 5 has an architecture identical to the slave integrated circuit 2.

The slave integrated circuit 2 comprises a communication interface 6 configured so as to communicate with the bus 3, a processing unit 7 and a non-volatile memory 8 that are connected to one another by an internal bus 9.

The non-volatile memory 8 is for example a flash memory.

The communication interface 6 comprises a communication module 10 connected firstly to the serial data line SDA and to the serial clock line SCL of the bus 3, and secondly to a volatile memory 11, for example a RAM memory.

The communication interface 6 furthermore comprises an initialization register 12.

The volatile memory 11 and the initialization register 12 are connected to the internal bus 9.

The initialization register 12 contains a default address ADD1 and a second unique address ADD2 (extended address) that are given by the manufacturer of the device 1.

The default address ADD1 allows the master integrated circuit 4 to identify the slave integrated circuit 2 on the bus 3.

As the slave integrated circuits 2 and 5 have an identical architecture, it is assumed that the default address of the second circuit 5 is identical to that of the slave integrated circuit 2, such that the two circuits 2 and 5 are identified on the bus 3 by the same address ADD1, and that the second circuit 5 has a second unique address ADD21 different from the second unique address ADD2 of the slave integrated circuit 2.

As the two integrated circuits 2 and 5 have the same address ADD1 on the bus, the two circuits 2 and 5 create an addressing conflict on the bus 3.

It is then necessary to modify the default address of at least one of the slave integrated circuits 2 and 5.

Hereinafter, it is proposed to replace the default address of the slave integrated circuit 2.

The device 1 is configured so as to replace the default address ADD1 within the slave integrated circuit 2 with a replacement address ADD3 upon receiving an addressing message MESS conveyed on the bus 3 and containing the replacement address ADD3.

The master integrated circuit 4 is configured so as to transmit the addressing message MESS.

The addressing message MESS furthermore contains an indication IND able to be interpreted by the slave integrated circuits 2 and 5, and instructions INST to replace the default address ADD1 with the address ADD3 on the bus 3.

The addressing message MESS furthermore contains the second address ADD2, such that the slave integrated circuit 2 identifies itself as being the intended recipient of the addressing message.

Only the slave integrated circuit 2 denoted by the second address ADD2 contained in the addressing message MESS is configured so as to replace its default address ADD1 with the replacement address ADD3.

The non-volatile memory 8 is configured so as to store the replacement address ADD3 such that, upon each subsequent restart of the slave integrated circuit 2, the slave integrated circuit 2 reads the content of the memory defining its default address ADD1 on the bus.

Upon each restart, the processing unit 7 reads the content of the non-volatile memory 8. If the memory 8 contains the address ADD3, the processing unit 7 copies the address ADD3 into the volatile memory 11. The address ADD3 is used by the communication module 10 to identify the slave integrated circuit 2 on the bus.

In the following text, the same alphanumeric references denote the same elements.

Figure 3:
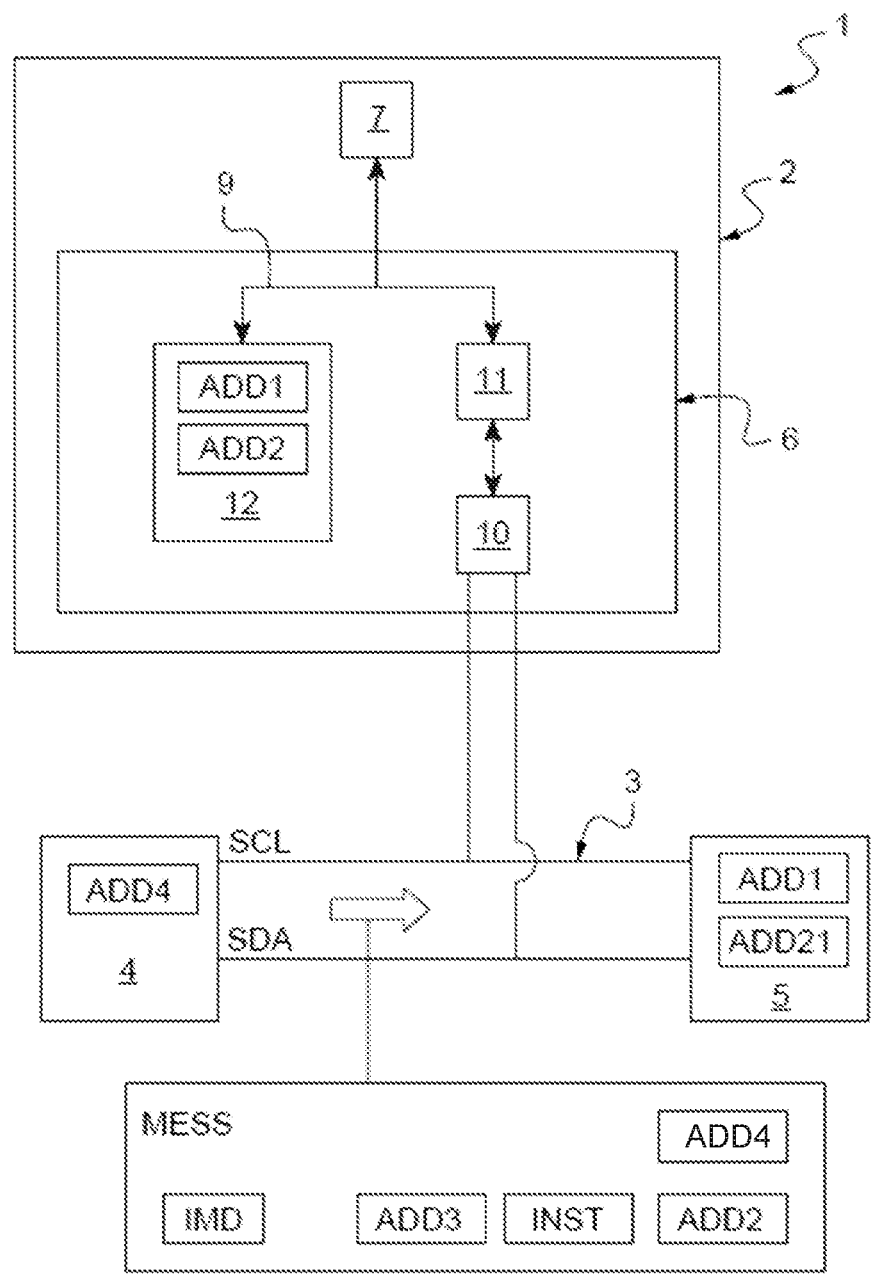
FIG. 3 shows one example of a second embodiment of the device.

Reference is made to FIG. 3, which shows one example of a second embodiment of the device 1.

As shown, the slave integrated circuits 2 and 5 and the master integrated circuit 4 are connected to the bus 3.

This embodiment differs from the first embodiment illustrated in FIG. 2 in that the slave integrated circuit 2 does not comprise a non-volatile memory.

The volatile memory 11 is configured so as to store the replacement address ADD3.

The master integrated circuit 4 is configured so as to retransmit the addressing message MESS upon each subsequent restart of the slave integrated circuit 2.

The addressing message MESS furthermore comprises the address ADD4 of the master integrated circuit 4.

Figure 4:
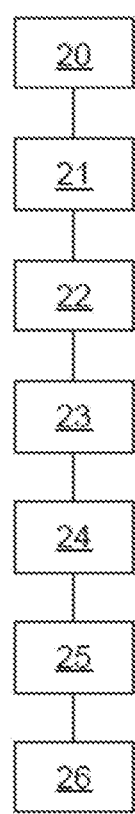
FIG. 4 illustrates one exemplary implementation of a device according to embodiments of the invention.

Reference is made to FIG. 4, which illustrates one exemplary implementation of the device 1.

In a first step 20, the master integrated circuit 4 transmits the starting condition STT followed by the indication IND able to be interpreted by the slave integrated circuits 2 and 5. In the case of the I²C bus, this is a general call represented by one byte, all of the bits of which are equal to the low level "0".

Upon receiving confirmation bits ACK transmitted by the slave integrated circuits 2 and 5 capable of interpreting the indication IND, the master integrated circuit 4 transmits a byte comprising its address ADD4 coded on seven bits and one high-level bit "1" (step 21).

If a slave integrated circuit is not capable of interpreting the indication IND, it does not return a confirmation bit ACK.

In this case, it is not able to modify its default address.

Upon receiving confirmation bits ACK transmitted by the slave integrated circuits 2 and 5, the master integrated circuit 4 transmits a byte comprising the instructions INST (step 22).

Upon receiving confirmation bits ACK transmitted by the slave integrated circuits 2 and 5, the master integrated circuit 4 transmits a byte comprising the second unique address ADD2 coded on a plurality of bits (step 23).

If the address ADD2 is coded on more than eight bits, the master integrated circuit 4 divides the address ADD2 into a plurality of bytes, each byte being transmitted after the reception of a confirmation bit transmitted by the slave integrated circuits 2 and 5.

Then, upon receiving confirmation bits ACK transmitted by the slave integrated circuits 2 and 5, the master integrated circuit 4 transmits a byte comprising the replacement address ADD3 coded on one byte (step 24).

Then, upon receiving confirmation bits ACK transmitted by the slave integrated circuits 2 and 5, the master integrated circuit 4 transmits the end condition STP (step 25).

The message MESS is stored in the volatile memory 11 of each slave integrated circuit 2, 5 as it is received.

Upon receiving the end condition STP, the processing unit 7 of each slave integrated circuit 2, 5 executes the message MESS stored in the volatile memory 11 (step 26).

As the slave integrated circuit 2 has the second unique address ADD2, the processing unit 7 stores the address ADD3 in the non-volatile memory 8.

When the slave integrated circuit 2 does not have a non-volatile memory, the processing unit 7 stores the address ADD3 in the volatile memory 11.

In this case, upon each restart of the slave integrated circuit 2, the master integrated circuit 4 is informed of the starting of the circuit 2 by the bus 3 and retransmits the addressing message MESS.

As a variant, the addresses ADD1 and ADD3 may be coded on ten bits in accordance with the I²C standard, the address containing a first byte containing the code 11110 on the first five bits following the two most significant bits of the address and a second byte containing the eight following bits of the address.

As a variant, the addressing message MESS may furthermore comprise a code for checking the integrity of the dispatched data, such that the master integrated circuit transmitting the addressing message MESS is able to ensure that the slave integrated circuit that is the intended recipient of the addressing message has received the addressing message MESS.

Of course, although the bus 3 is an I²C bus in the above text, the addressing method also applies to any bus able to transit a general call able to be interpreted by slave integrated circuits connected to the bus.

What is claimed is:

1. A method for addressing a first slave integrated circuit connected to a bus, the first slave integrated circuit having a default address on the bus, the method comprising:
    receiving, at the first slave integrated circuit, an addressing message conveyed on the bus, the addressing message containing a replacement address and the addressing message containing a unique address of the first slave integrated circuit, the first slave integrated circuit identifying itself as an intended recipient of the addressing message based on the unique address;

replacing the default address within the first slave integrated circuit with the replacement address upon receiving the addressing message;

restarting the first slave integrated circuit; and upon the restarting, assigning the replacement address as a new default address.

2. The method according to claim 1, wherein the bus is an inter-integrated circuit (I2C) bus and the addressing message is received from a master integrated circuit connected to the bus.

3. The method according to claim 1, further comprising storing the replacement address in a non-volatile memory of the first slave integrated circuit, wherein assigning the replacement address as the new default address comprises reading the replacement address from the non-volatile memory upon the restarting.

4. The method according to claim 3, wherein the bus is an inter-integrated circuit (I2C) bus and the addressing message is received from a master integrated circuit connected to the bus.

5. The method according to claim 1, wherein assigning the replacement address as the new default address comprises receiving, at the first slave integrated circuit upon the restarting, a second addressing message conveyed on the bus, the second addressing message containing the replacement address.

6. The method according to claim 5, wherein the bus is an inter-integrated circuit (I2C) bus, and the addressing message and the second addressing message are received from a master integrated circuit connected to the bus.

7. The method according to claim 1, wherein a plurality of slave integrated circuits are connected to the bus;

and wherein the addressing message also contains an indication able to be interpreted by the slave integrated circuits such that only the first slave integrated circuit denoted by the unique address contained in the addressing message replaces the default address with the replacement address.

8. A device comprising:

a master integrated circuit;

a first slave integrated circuit having a first default address;

a second slave integrated circuit having a second default address; and a bus connecting the master integrated circuit, the first slave integrated circuit and the second slave integrated circuit; and wherein the device is configured so as to replace the first default address with a replacement address in response to an addressing message conveyed on the bus from the master integrated circuit to the first slave integrated circuit, the addressing message containing the replacement address and the addressing message containing a unique address of the first slave integrated circuit, the first slave integrated circuit being configured to identify itself as an intended recipient of the addressing message based on the unique address.

9. The device according to claim 8, wherein the bus is an inter-integrated circuit (I2C) bus.

10. The device according to claim 8, wherein the second slave integrated circuit also has a second unique address.

11. The device according to claim 8, wherein the addressing message further contains an indication able to be interpreted by the first and second slave integrated circuits so that only the slave integrated circuit denoted by the indication contained in the addressing message is configured to replace its default address with the replacement address.

12. The device according to claim 8, wherein the first slave integrated circuit comprises a non-volatile memory configured to store the replacement address such that, upon each subsequent restart of the first slave integrated circuit, the first slave integrated circuit is configured to read content of the non-volatile memory and to treat the stored replacement address as the first default address.

13. The device according to claim 8, wherein the first slave integrated circuit comprises a volatile memory configured to store the replacement address, the master integrated circuit being configured to retransmit the addressing message upon each subsequent restart of the first slave integrated circuit.

14. An integrated circuit comprising:

a communication interface configured to be coupled with a bus;

a processing unit configured to receive an addressing message from the bus via the communication interface, the addressing message containing a replacement address to be used to replace a default address of the integrated circuit and the addressing message containing a unique address of the integrated circuit, the processing unit being configured to determine that the replacement address is to be used to replace the default address by determining that the integrated circuit is an intended recipient of the addressing message based on the unique address; and a non-volatile memory coupled to the processing unit, the non-volatile memory configured to store the replacement address so that upon restart of the integrated circuit the processing unit can use the replacement address as the default address of the integrated circuit.

15. The integrated circuit according to claim 14, wherein the communication interface is an inter-integrated circuit (I2C) bus communication interface.

16. The integrated circuit according to claim 15, wherein the integrated circuit is a slave integrated circuit in an inter-integrated circuit (I2C) bus system that includes a master device and further slave devices.

* * * * *